(12) United States Patent
Trichy et al.

(10) Patent No.: US 7,567,105 B2
(45) Date of Patent: Jul. 28, 2009

(54) HIGH SPEED CONTROLLER AREA NETWORK RECEIVER HAVING IMPROVED EMI IMMUNITY

(75) Inventors: Narasimhan R. Trichy, Dallas, TX (US); Wayne Tien-Feng Chen, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 719 days.

(21) Appl. No.: 11/317,972

(22) Filed: Dec. 23, 2005

(65) Prior Publication Data

US 2006/0160511 A1 Jul. 20, 2006

Related U.S. Application Data

(60) Provisional application No. 60/640,115, filed on Dec. 28, 2004.

(51) Int. Cl.
*H03K 3/00* (2006.01)

(52) U.S. Cl. .................. 327/170; 327/112; 327/379; 326/86

(58) Field of Classification Search .............. 327/437, 327/379, 546; 375/317, 224, 316; 330/261; 326/26, 27

See application file for complete search history.

(56) References Cited

U.S. PATENT DOCUMENTS

| | | | |
|---|---|---|---|
| 5,598,128 A | | 1/1997 | Veit et al. |
| 6,324,044 B1 * | | 11/2001 | Teggatz et al. .............. 361/119 |
| 6,366,168 B1 | | 4/2002 | Zheng et al. |
| 6,493,401 B1 * | | 12/2002 | Erckert ........................ 375/316 |
| 6,587,968 B1 * | | 7/2003 | Leyva ........................... 714/43 |
| 6,753,732 B1 * | | 6/2004 | Moreland ..................... 330/261 |
| 6,922,073 B2 * | | 7/2005 | Haase et al. ................... 326/27 |
| 7,183,793 B2 * | | 2/2007 | Jordanger et al. .............. 326/26 |
| 7,242,227 B2 * | | 7/2007 | Pauletti et al. ............... 327/112 |

FOREIGN PATENT DOCUMENTS

| | | |
|---|---|---|
| EP | 1404078 A1 | 9/2002 |
| WO | 00/67432 | 9/2000 |

* cited by examiner

*Primary Examiner*—Vibol Tan
(74) *Attorney, Agent, or Firm*—William B. Kempler; Wade J. Brady, III; Frederick J. Telecky, Jr.

(57) ABSTRACT

A CAN receiver architecture design that provides better immunity against EMI interference than conventional designs is disclosed herein. This CAN receiver includes a voltage divider network connected to a front-end amplifier for dividing down the input signal from a two wire line by a predetermined amount and amplifying the signal by the same predetermined amount. The front-end amplifier generates the common-mode voltage of the input signal for a reference generator that determines the logic level of the incoming signal and subtracts a bandgap voltage reference from the common-mode voltage. A comparator compares the difference between the output of the front-end amplifier and the resultant signal generated by the reference generator to generate an output signal for the receiver. This CAN receiver architecture is faster than conventional designs and possesses an improved common-mode rejection, while operating over a wide input common mode range.

18 Claims, 4 Drawing Sheets

HIGH SPEED CONTROLLER AREA NETWORK RECEIVER HAVING IMPROVED EMI IMMUNITY

This application claims the benefit of Application Ser. No. 60/640,115 filed Dec. 28, 2004, which is incorporated herein by reference.

FIELD OF THE INVENTION

The present invention relates to controller area network transceivers and, more particularly, to a controller area network receiver having an improved EMI immunity.

BACKGROUND OF THE INVENTION

A controller area network (CAN) bus, such as that compliant with the ISO 11898 standard, is used in several systems including industrial, automotive, robotic, and motor control systems to provide a serial communication physical layer. The robust CAN bus provides low power requirements, space savings and reduced resources. As shown in FIG. 1, a CAN node is comprised of three basic parts: a processor, a network controller, and a transceiver. The transceiver interfaces the single-ended CAN controller with the differential CAN bus. The bus, as shown in FIG. 2, includes multiple nodes that transmit messages on-demand by any node whenever the bus is free. The transceiver broadcasts data such that all nodes receive each message sent on the bus, including the node that sent it. The effect of broadcasting of data allows multiple nodes to utilize the data transmitted.

Texas Instruments has introduced CAN transceiver models: SN65HVD230, SN65HVD231, and SN65HVD232, for use in applications employing the CAN serial communication physical layer in compliance with the ISO 11898 Standard. As a CAN transceiver, as shown in FIG. 3, the disclosed model provides differential transmit capability to the bus and differential receive capability to a CAN controller at speeds of up to 1 Mbps. Designed for operation in especially harsh environments, the CAN transceiver features cross-wire, over voltage and loss of ground, over-temperature protection as well as −20 V to 20 V common-mode range, and withstands transients of ±30 V.

Specifically, a controller area network is a differential signaling system used for communication between modules in automobiles that makes use of two bus lines namely, CANH and CANL. Data communication occurs mainly by differentiating between the two possible states on the bus—a dominant state during which a differential voltage $V_{diff}$ is established between the two bus lines, CANH and CANL, and a recessive state during which there is no differential voltage as is shown in the graphic representation of FIG. 4. In the latter state, bus lines, CANH and CANL are both in a high-impedance state and the driver is inactive, while the receiver is still able to receive data.

The dominant and recessive states are used to signal binary data which is detected by the receiver. In operation, the receiver simply signals a logic high when the differential voltage on the CAN bus is more than 900 mV and signals a logic low when the differential voltage is less than 500 mV. The input differential voltage can vary between 0 and 3V while the common mode range for the input signal can vary from −20 to 20V. This voltage range is substantially greater than the supply voltage of 5V. The threshold voltage where the receiver switches state from low to high is approximately 800 mV ($V_H$) and the lower threshold voltage when the receiver switches state from high to low is approximately 600 mV ($V_L$). The hysteresis ($V_H$−$V_L$) should be greater than 100 mV, while the thresholds should be in the 900 mV-500 mV window.

The time from when the differential voltage of 900 mV is established on the bus to the time when the data is output from the receiver is critical since it directly effects loop time which is a specification that indicates the speed of the transceiver. Loop time is the time delay between the instant when the input voltage to the receiver reaches 50% of the final (logic high or low) voltage during a rising or a falling transition to the instant when the output of the receiver changes by 50% during a rising or falling transition. Accordingly, delay in the receiver affects the speed of the transceiver. Therefore, the receiver must be fast. In addition, the receiver should also have extremely good common mode rejection for better immunity against EMI interference. EMI creates errors in reading the data. In order to avoid these errors, the data rate must be slowed so that the data sampling time can be increased. The reduced data rate increases the latency of devices connected to the CAN bus or reduces the number of devices the bus can handle within a specified latency.

There is a need for a CAN receiver architecture design that provides better immunity against EMI interference than conventional designs. In addition, this CAN receiver architecture must be faster than conventional designs and possess an improved common-mode rejection, while operating over a wide input common mode range.

It is a general object to overcome, or at least reduce the effects of one or more of the problems set forth above.

This and other objects and features of the invention are provided, in accordance with one aspect of the intention by a Controller Area Network (CAN) receiver comprising a voltage divider coupleable to a controller area network bus for dividing a signal on the bus by a predetermined factor N to generate an input signal. A front end amplifier amplifies the input signal by a predetermined factor substantially equal to 1/N.

Another aspect of the invention includes a method of receiving signals on a Controller Area Network (CAN) bus comprising dividing a bus signal by a predetermined factor N to generate an input signal. The input signal is amplified by a predetermined factor substantially equal to 1/N.

The following description and annexed drawings set forth in detail certain illustrative aspects and implementations of the invention. These are indicative of but a few of the various ways in which the principles of the invention may be employed.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

Figure 1:
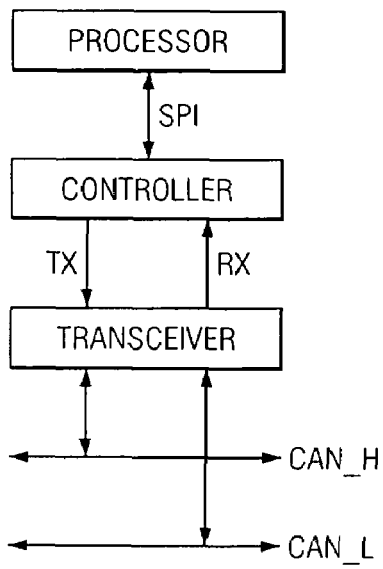
FIG. 1 illustrates a known structure of a controller area network (CAN)
Figure 2:
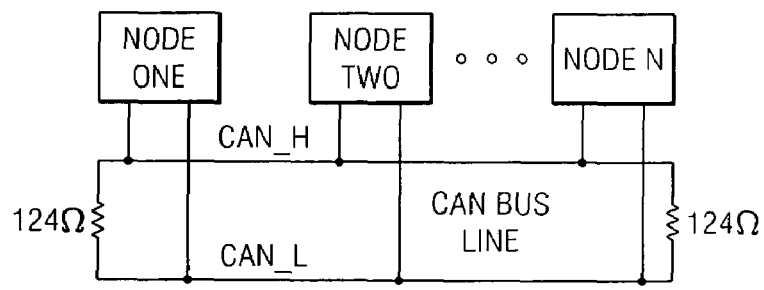
FIG. 2 displays a known CAN bus having a multipoint topology.
Figure 3:
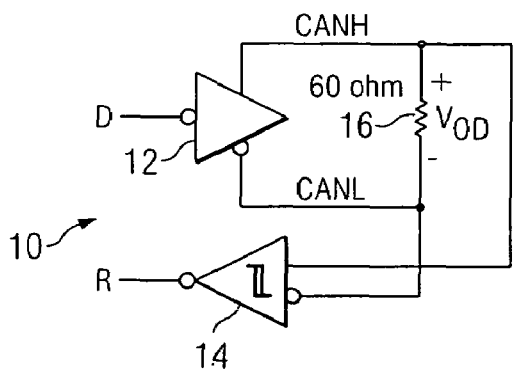
FIG. 3 illustrates a known CAN transceiver architecture.
Figure 4:
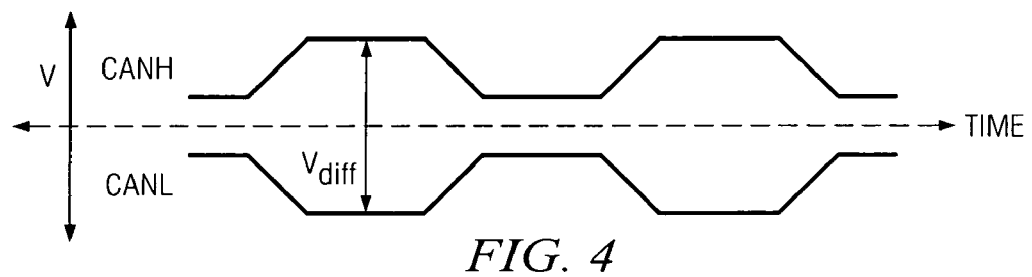
FIG. 4 displays the input signals, CANH and CANL, relative to the voltage differential signal $V_{diff}$.

One or more exemplary implementations of the present invention will now be described with reference to the attached drawings, wherein like reference numerals are used to refer to like elements throughout. The various aspects of the invention are illustrated below in a CAN receiver, although the invention and the appended claims are not limited to the illustrated examples.

One of the design challenges was to design an architecture that may be powered by a 5 volt supply voltage $V_{CC}$ and have a common mode voltage range that could possibly extend from +20V to −20V. The novel CAN receiver had to possess a good amount of rejection. Thereby, the basic challenge was that the input signal, CANH and CANL, represent signal that are a significant amount of voltage greater than the supply voltage $V_{CC}$ and signal to noise ratio could deteriorate if the input signal is divided down too much to avoid the high input common mode signal.

Figure 5:
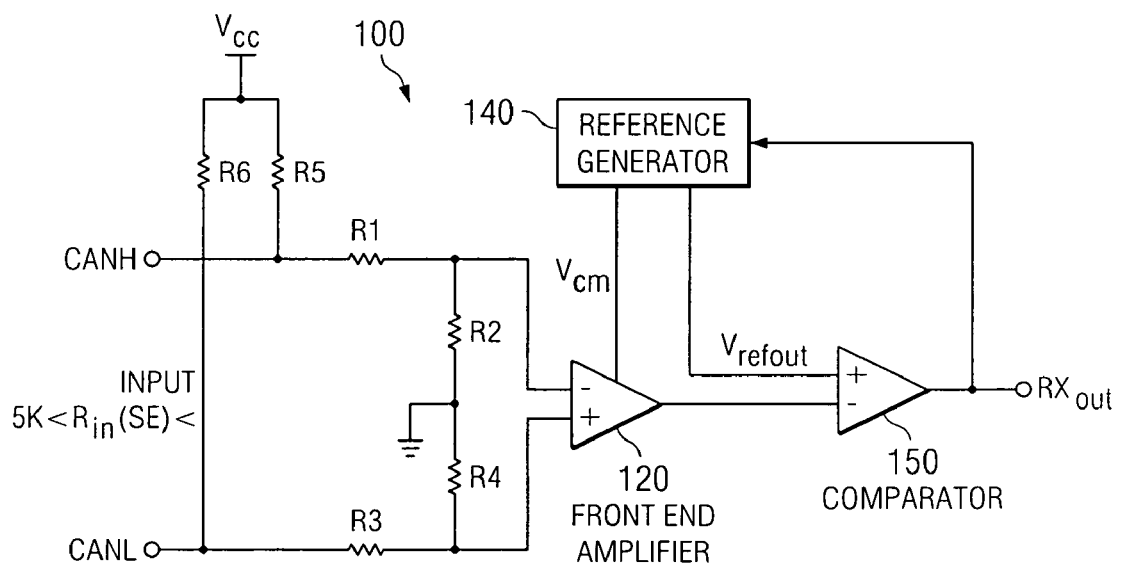
FIG. 5 illustrates a block diagram of the novel CAN receiver architecture in accordance with the present invention.
Figure 6:
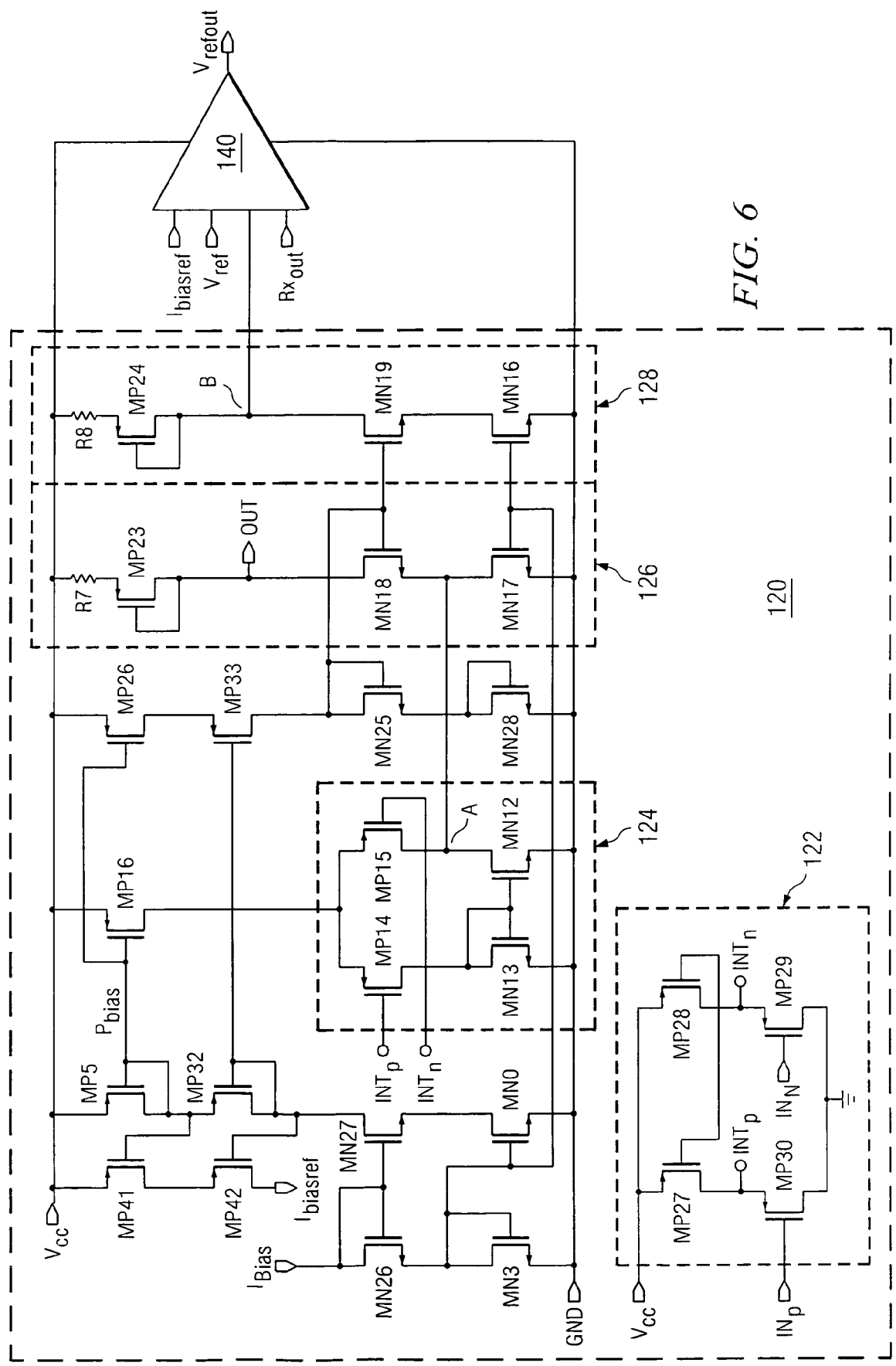
FIG. 6 shows the front-end amplifier.

FIGS. 5 and 6 illustrates a block diagram of the novel CAN receiver that provides better immunity against EMI interference than conventional designs. In general, receiver 100 includes a voltage divider network connected to a front-end amplifier 120. The input signal represented on the two-wire line, CANH and CANL, has a wide common mode voltage range which the voltage divider network, comprising resistors R1, R2, R3, R4, R5 and R6, divides down by factor of some predetermined value, for example, 20. Accordingly, the common mode voltage range is a manageable −1V to +1V after the division of the voltage divider network. Specifically, using the aforementioned example, the resultant divided input signal is input into front-end amplifier 120 which gains the signal back by a factor of the same predetermined value of 20 while rejecting the input common mode voltage $V_{CM}$. Thereby, the output signal of the front-end amplifier 120 is equal to the input differential voltage $V_{diff}$ riding over the output common mode voltage $V_{cm}$ of the amplifier 120. The reference generator senses $V_{cm}$ and generates a reference $V_{refout}$ by subtracting a bandgap voltage from $V_{cm}$. A comparator then compares the output of amplifier 120 with $V_{refout}$ to resolve the logic high or low based on the input signal, CANH and CANL. Specifically, the reference generator 140 subtracts the reference bandgap voltage $V_{BG}$ from the common-mode voltage signal $V_{CM}$. The reference output signal provided by the reference generator 140 that is fed into the comparator must be accurate since the receiver 100 thresholds must be precise. Therefore, the output common mode voltage $V_{CM}$ of the amplifier 120 is sampled by the reference generator 140 which then subtracts the band-gap referenced voltage $V_{BG}$ to create two reference voltages, $V_{REF1}$ and $V_{REF2}$ that tracks over process, temperature and supply variations. The band-gap reference voltage $V_{BG}$ in an embodiment in accordance with the present invention may be either 0.6 or 0.8V ($V_{REF2}$). Thereby, the hysteresis in the receiver represents the second reference voltage subtracted by the first reference voltage ($V_{REF2}-V_{REF1}$). Moreover, the hysteresis is precise.

Specifically, following the aforementioned example, the block diagram shown in FIG. 5 shows that the inputs, CANH and CANL, connect to a resistor divider circuit including resistors R1-R4. The power supply rail $V_{CC}$ of 5 volts connects to the resistors, R5 and R6, in an effort to pull up each input, CANH and CANL, to 2.5 volts which represents the regular common-mode voltage $V_{CM}$ of the receiver 100. Resistors, R1 and R2, further divide the voltage of input CANH by 20 which is applied to the negative input of the front end amplifier 120, having a gain of approximately 20. Similarly, resistors, R3 and R4, further divide the voltage of input CANL which is applied to the positive input of amplifier 120. Thereby, a +/−20 volt input at CANH looks like a +/−1 volt input at the respective positive and negative inputs of amplifier 120. The initial attenuation from resistors, R1 and R2, generates a 1/20 ratio. The gain of amplifier 120, however, cancels out the effects of the voltage divider. The primary reason for amplifier 120 is to reject the common mode signal on inputs, CANH and CANL. Moreover, amplifier 120 monitors the differential signal $V_{diff}$ which is made available for comparator 150 to determine the data output from receiver 100.

The input resistor divider network, including resistors R1-R4, is used along with high voltage switches that minimize leakage currents in the sleep mode. The divider network is set up such that the bus voltage is pulled up to 2.5V by the receiver 100 when the driver is inactive. This, however, is a weak pull-up and is necessary to maintain the common mode voltage $V_{CM}$ of the bus during the recessive state (a high Z state). Since the CAN driver (not shown) drives weak loads associated with receivers in all nodes on the CAN bus, the input impedance of the receiver has to be set between 5 and 50K Ohms (single ended) in an effort to minimize the load to the driver. The input impedance of the receiver 100 is determined by these resistor values R1-R6 and, thus, can be easily changed to meet any specification. Diode clamps may be used to protect the input devices in the front end amplifier 120 from high voltage transients on the CAN bus, CANH and CANL. By setting a higher divider ratio and a higher matching gain in the amplifier 120, receiver 100 can be easily modified to extend the common mode voltage $V_{CM}$ range of operation beyond −20-20V.

FIG. 6 represents the front-end amplifier architecture 120 coupled to the reference generator 140. Since the input signal attenuation leads to loss of the signal to noise ratio (SNR) and the threshold voltages of the input are 25 mV and 45 mV, amplifier 120 has been designed for low offset due to the effect that the amplifier may have upon the threshold voltage of the receiver 100. As shown, in order to increase the speed while not risking stability, an open loop configuration has been implemented. A fixed gain of 20 is realized in an effort to match the attenuation in the front end. This gain is accomplished using a differential input stage 124 having a diode-resistor, (MP23 and R7), combination for a load. The advantage of using differential pair 124 in the input is that it retains good common mode rejection. To boost the input common mode voltage range to negative voltages, the input is offset using a PMOS source follower stage 122. The CAN bus signal is coupled to the inputs $IN_P$ and $IN_N$ and the outputs $INT_P$ and $INT_N$ are coupled to the gates of transistors MP14 and MP15 in stage 124. The diode-resistor, MP23 and R7, combination provides a fixed gain and it is roughly equal to $gm_1/gm_2$ where $gm_1$ is the input transconductance and $gm_2$ is the transconductance of the resistor degenerated diode MP23.

The transconductance of the input stage 122 varies over temperature. Accordingly, by varying the resistor and transistor size of the diode connected transistor MP23, the gain of the amplifier 120 can be made fairly temperature insensitive. The gain, however, still changes with signal amplitude and the load is adjusted such that the gain is linear in the 0.5 to 0.9V range where the receiver CAN thresholds exist. The output common mode voltage $V_{CM}$ is set by the voltage drop across the diode and resistor, MP23 and R7, which varies over process and temperature. A second (dummy) output stage is of identical construction to the output stage 126 and set to the same bias point by the biasing circuit described below 128. The second output stage 128 tracks the output common mode voltage $V_{CM}$ which is used by reference generator 140 to generate a voltage reference output $V_{refout}$ for comparator 150. The second (dummy) output stage can be sealed down in size to reduce power consumption. Reference voltage generator 140 may include 3 bits of an EEPROM trim to re-center the thresholds for receiver 100 as an adjustment for process variations.

In FIG. 6, inputs, $IN_P$ and $IN_N$, are the positive and negative inputs of amplifier 120. The input common-mode range will be from −1V to +1V. Transistors, MP30 and MP29, offset the input signals at nodes, $IN_P$ and $IN_N$; thereby when the common-mode voltage $V_{CM}$ is a negative voltage then the follower is offset to a point where the common-mode voltage $V_{CM}$ is positive. Internal input nodes, $INT_P$ and $INT_N$, are applied to the inputs of the differential amplifier 124. Primarily, input stage 122 converts any negative signals of either input, $IN_P$ and $IN_N$, into positive signals that are able to connect to the differential amplifier 124 at nodes, $INT_p$ and $INT_n$. Differential amplifier 124 represents a simple folded cascoded amplifier, wherein transistors, MN25 and MN28, set up the bias voltage for transistors, MN18 and MN19, within output stages, 126 and 128.

Node A represents the output of the differential amplifier 124. First output stage 126 is replicated by second output stage 128 which mimics the common-mode voltage $V_{CM}$ that is to be passed on to reference generator 140. Reference generator 140 subtracts the bandgap voltage $V_{BG}$, either $V_{ref1}$ or $V_{ref2}$ (0.6 v or 0.8 v) from the common-mode voltage at node B. The bandgap voltage $V_{BG}$ will either be 0.6 or 0.8 depending upon whether the data is transitioning to a voltage high or "1" or whether the data is transitioning to a voltage low or '0'. This is where the hysteresis exists between making a decision of whether the incoming data represents a "0" or a "1". Anytime the voltage of the incoming data is greater than 0.8, then the receiver designates the incoming data is a "1". Once it is determined that a "1" is present, then the receiver 100 knows that when a 0.6 V signal is detected at the input of the CAN receiver 100 that the input data signal is transitioning to a "0". Reference generator 140 is responsible for this decision making process. The resultant voltage appears at output node $V_{RefOut}$ and is passed on to comparator 150. As a result, the comparator 150 compares the output of the amplifier 120 with the output from the reference generator 140 to provide a data output for receiver 100.

Amplifier 120 is a current based gain stage which is much faster and does not have to be compensated. In addition, there is no problem with stability and compensating the loop, since amplifier 120 is an open loop amplifier. The gain is set by the transconductance of the differential amplifier 124 and the transconductance of series connected resistor load R7 and the diode connected transistor MP23. This gain is fixed to be the same as the resistor divider network including resistors, R1, R2, R3 and R4 shown in FIG. 5. Thereby, the input signal is divided down by a factor N and the amplifier 120 applies a gain that is a reciprocal of this same factor.

Figure 7:
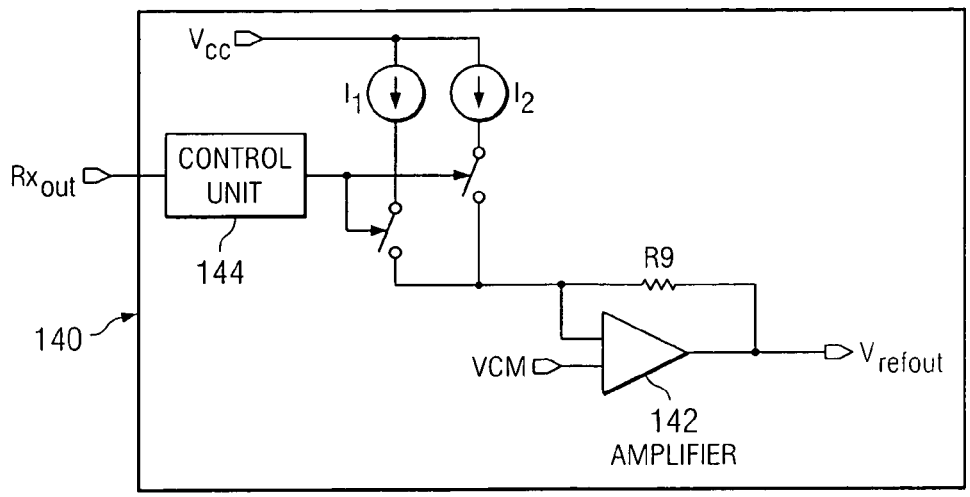
FIG. 7 displays a block diagram of reference generator of the novel CAN receiver in accordance with the present invention.

FIG. 7 displays the block diagram of the reference generator 140 that generates a signal that is either a first or a second reference voltage, $V_{ref1}$ or $V_{ref2}$ (i.e. 0.6 or 0.8 volts), away from the common-mode voltage $V_{CM}$. A first and a second current source supply, $I_1$ and $I_2$, generate a current that is proportional to the first and second reference voltage, $V_{ref1}$ or $V_{ref2}$. Accordingly, reference generator 140 generates a first and a second bandgap voltage and corresponding first and second bandgap current using a reference voltage and a voltage divider network. A control unit 144, that receives the output signal $R_{xout}$ from the receiver 100, determines whether the first or second bandgap current, $I_1$ or $I_2$, is selected. An amplifier 142 includes a first input that connects to receive the common-mode signal $V_{CM}$ from the front-end amplifier 120 and a second input that connects to receive the first or the second bandgap current, $I_1$ or $I_2$. A resistor R9 connects between the second input and output $V_{refout}$ to provide a feedback network such that the resultant output signal $V_{refout}$ is the common-mode voltage signal $V_{CM}$ minus the first or the second bandgap voltage, $V_{ref1}$ or $V_{ref2}$.

Figure 8:
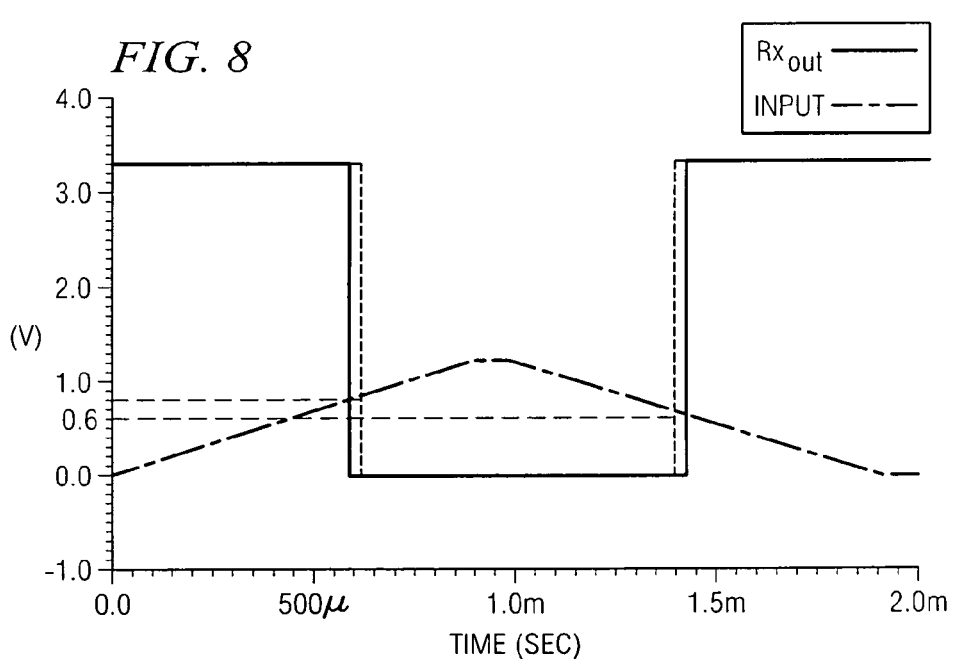
FIG. 8 shows a graph of the input signal with respect to the output signal generated by the novel CAN receiver in accordance with the present invention.

FIG. 8 illustrates the input signal of the receiver 100 as it transitions from low to high and from high to low with reference to the signal that the receiver determines that it represents whether a logic high "1" or a logic low "0". When the input differential voltage of CAN receiver 100 is more than 0.8 volts the receiver detects a logic high "1". After it has detected a logic high "1", and the input starts to decrease, receiver 100 does not make a determination that the signal is a logic low "0" until after the input has decremented to a signal below 0.6 volts. This provides a form of hysteresis. FIG. 8 shows the inverted polarity of the signal detected. Furthermore, FIG. 8 shows the simulated temperature variation of the threshold voltages for nominal models.

Figure 9:
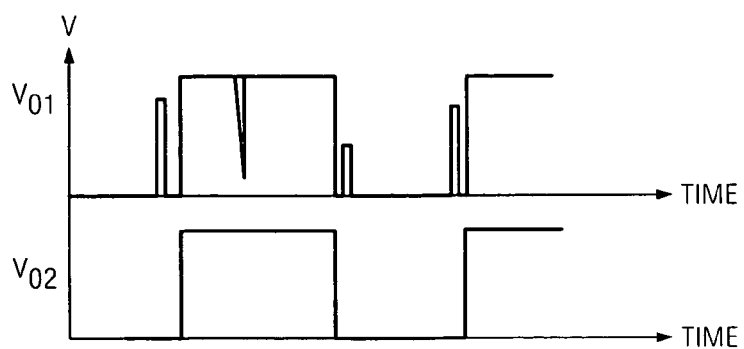
FIG. 9 illustrates a comparison of the output signal from a known CAN receiver and that of a CAN receiver in accordance with the present invention under high frequency signal application and testing.

FIG. 9 displays a comparison of an output signal from a known CAN receiver and that of a CAN receiver in accordance with the present invention under high frequency signal application and testing. Under testing conditions when, a high frequency signal is injected into the input of either receiver, a respective output signal is as shown. Output signal $V_{O1}$ represents the output of the conventional receiver under a high frequency testing implementation. Notice there are glitches. Yet, in the output signal $V_{O2}$ of the receiver 100 in accordance with the present invention, no glitches are present. The receiver 100 has high immunity in the sense that even though the high frequency and high amplitude AC signal is input to the receiver, the output is distinct without glitches. Ultimately, the receiver 100 in accordance with the present invention can stand a higher amount of spurious transients and EMI interference than the previous architectures of conventional receivers. Specifically for the older architectures, a flawed output signal having glitches exists even for input EMI power levels of 20 dBm but the receiver 100 in accordance with the present invention keeps signal integrity even up to 38 dBm. The difference of 18 dB equates to the receiver in accordance with the present invention having an EMI immunity that is 9 times better than the conventional architecture.

More particularly, there is a wide spectrum of electromagnetic (EM) noise in automobiles and the receiver 100 has to operate even when there is common mode noise injected into the CAN bus. This is simulated by checking the performance of the receiver while injecting a 30V (peak) common mode signal. The differential signal is superimposed over and top of the common mode signal and the receiver operation is checked. Specifically, the output of the receiver (RXout) is scanned for glitches which would indicate a failure. On the test bench, the EMI Immunity is checked from 2 MHz to 1 GHz by varying the power of the injected EMI signal and increasing it until the receiver fails. Measurements on silicon indicate good performance with EMI immunity up to 30 dBm @ 10 MHz which is a 12 dB improvement over older designs.

This topology improves the speed of the CAN transceiver. Given a 100 ns rise time from 0.5V to 0.9V for the input differential voltage $V_{diff}$, the propagation delay through the receiver 100 is approximately 25 ns. Incorporating an open loop gain stage and a fast comparator 150 helps to minimize the propagation time through the receiver 100 and to improve the loop time of the transceiver from loop times of 260 nS in prior receiver, architecture to 110 ns in the present invention which is well within the boundaries of a specification requirement of 160 ns.

The advantages of this CAN receiver architecture design includes but is not limited to a CAN receiver that provides better immunity against EMI interference than conventional designs. In addition, this CAN receiver architecture is faster than conventional designs and possesses an improved common-mode rejection, while operating over a wide input common mode range.

The architecture is simple to implement unlike previous solutions that use more complex blocks to achieve the required common mode input range. The input common mode range can be extended further by increasing the voltage division in the input stage. The simple architecture along with the design of the amplifier improves speed and reduces propagation delay through the receiver. By making use of a differential pair 124 at the input, a very good common mode rejection can be attained and this improves EMI immunity from 16 dB in older designs to 30 dB in the present invention, a 14 dB improvement at 10 MHz The circuit is being used as part of a CAN transceiver. FIG. 1 represents a CAN receiver that works in conjunction with a transmitter. It is an automotive signaling system. The basic advantages of this architecture is speed.

While the principles of the present invention have been demonstrated with particular regard to the structures and methods disclosed herein, it will be recognized that various departures may be undertaken in the practice of the invention. The scope of the invention is not intended to be limited to the particular structures and methods disclosed herein, but should instead be gauged by the breadth of the claims that follow.

Those of skill in the art will recognize that the physical location of the elements illustrated in FIG. 5 can be moved or relocated while retaining the function described above. Furthermore, those skilled in the art may recognized that each resistor R1, R2, R3, and R4 may be substituted with a MOSFET transistor in the linear mode wherein the transistor is not saturated.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

The invention claimed is:

1. A Controller Area Network (CAN) receiver comprising:
    a voltage divider coupleable to a controller area network bus for dividing a signal on the bus by a predetermined factor N to generate an input signal;
    a front end amplifier coupled to the voltage divider for receiving the input signal, the front end amplifier amplifying the input signal by a predetermined factor substantially equal to 1/N; and
    a reference generator coupled to the front end amplifier to receive a common-mode voltage of the front end amplifier, the reference generator generating a voltage reference output signal equivalent to the front end amplifier common-mode voltage subtracted by a bandgap reference voltage wherein the bandgap reference voltage has a first value and a second value.

2. The receiver of claim 1 wherein the factor N is substantially 20.

3. The receiver of claim 1 wherein the front end amplifier rejects a common mode voltage present on the controller area network bus.

4. The receiver of claim 2 wherein the front end amplifier rejects a common mode voltage present on the controller area network bus.

5. The receiver of claim 1 wherein the first value of the bandgap reference voltage when subtracted from the front end amplifier common mode voltage generates a first comparison voltage to detect a digital one being transmitted on the controller area network and the second value of the bandgap reference when subtracted from the front end amplifier common-mode voltage to detect a digital zero being transmitted on the controller area network, the first and second comparison signals being an output signal of the reference generator.

6. The receiver of claim 5 further comprising:
    a comparator coupled to the front end amplifier and the reference to compare the output of the front end amplifier and the reference output signal, the comparator having an output coupled to the reference generator to provide feedback for controllably selecting whether the first value of the bandgap reference voltage or the second value of the bandgap reference voltage is selected as the reference generator output signal.

7. The receiver of claim 1 wherein the front end amplifier comprises a load circuit being biased to an operating point by a bias generator circuit;
    the reference generator comprises a dummy load circuit being substantially identical to the load circuit and being biased to substantially the same operating point by the bias generator circuit, the dummy load circuit not receiving an amplified input signal for generating a front end amplifier common-mode voltage.

8. The receiver of claim 6 wherein the reference generator comprises a first and a second current source switchably coupled to one input of an amplifier, the one input being connected to the output of the amplifier by a resistor; and
    a control unit responsive to an output of the comparator for controlling the switches, whereby current through the resistor is controlled to generate a first or a second value for the bandgap reference voltage.

9. The receiver of claim 1 further comprising a transmitter coupled to the receiver to form a transceiver and wherein loop time of the transceiver is less than substantially 160 ns.

10. A method of receiving signals on a Controller Area Network (CAN)

bus comprising:

dividing a bus signal by a predetermined factor N to generate an input signal; and amplifying the input signal by a predetermined factor substantially equal to 1/N;

generating a reference voltage signal equivalent to a common-mode voltage of the amplification step;

generating a reference voltage output signal by subtracting a bandgap reference voltage from the reference voltage signal, wherein the bandgap reference voltage can have a first value.

11. The method of claim 10 wherein the amplification is by an open loop amplifier.

12. The method of claim 10 wherein the amplification rejects a common-mode voltage present on the CAN bus.

13. The method of claim 11 wherein the amplification rejects a common-mode voltage present on the CAN bus.

14. The method of claim 10 wherein the step of generating a reference voltage output signal generates a first comparison voltage utilizing the first value of the bandgap reference voltage to detect the transmission of a digital one on a CAN bus; and generates a second comparison voltage utilizing the second value of the bandgap reference voltage to detect the transmission of a digital zero on the CAN bus.

15. The method of claim 14 further comprising:

comparing an output of the amplification step and the reference voltage to generate a received signal;

selecting the first or second value of the bandgap reference voltage based on the value of the received signal.

16. The method of claim 10 wherein:

the common-mode voltage utilized for generating a reference voltage signal is generated by a dummy load circuit being substantially identical to a load circuit for the amplification step and biased to substantially the same operating point as the load circuit.

17. The method of claim 15 wherein:

the step of selecting the first or second value for the bandgap reference voltage comprises switchably coupling a first or a second current source to a resistor coupled between an output and an input of an amplifier.

18. The method of claim 10 further comprising transmitting a signal on the CAN bus within a loop time of less than substantially 160 ns.

* * * * *